US010423905B2

(12) United States Patent
Pettersson (10) Patent No.: US 10,423,905 B2
(45) Date of Patent: Sep. 24, 2019

(54) WORK INFORMATION MODELLING

(71) Applicant: HEXAGON TECHNOLOGY CENTER GMBH, Heerbrugg (CH)

(72) Inventor: Bo Pettersson, Luxembourg (LU)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 704 days.

(21) Appl. No.: 15/014,380

(22) Filed: Feb. 3, 2016

(65) Prior Publication Data

US 2016/0224927 A1    Aug. 4, 2016

(30) Foreign Application Priority Data

Feb. 4, 2015    (EP) .................................... 15153842

(51) Int. Cl.
| | | |
|---|---|---|
| *G06Q 10/00* | (2012.01) | |
| *G06Q 10/06* | (2012.01) | |
| *H04B 5/00* | (2006.01) | |
| *G06Q 50/08* | (2012.01) | |

(52) U.S. Cl.
CPC ..... *G06Q 10/063112* (2013.01); *G06Q 10/06* (2013.01); *G06Q 10/067* (2013.01); *G06Q 10/063118* (2013.01); *G06Q 50/08* (2013.01); *H04B 5/0062* (2013.01)

(58) Field of Classification Search
None
See application file for complete search history.

(56) References Cited

U.S. PATENT DOCUMENTS

| | | | | |
|---|---|---|---|---|
| 5,552,995 A | * | 9/1996 | Sebastian | ............ B29C 33/3835 |
| | | | | 700/182 |
| 6,853,997 B2 | * | 2/2005 | Wotring | ............ G06F 17/30014 |
| | | | | 707/756 |
| 6,915,252 B1 | * | 7/2005 | Li | ........................... G06F 17/50 |
| | | | | 703/1 |
| 6,928,332 B2 | | 8/2005 | Gass | |
| 7,006,956 B1 | * | 2/2006 | Gerlovin | ................. G06F 17/50 |
| | | | | 703/6 |

(Continued)

FOREIGN PATENT DOCUMENTS

| | | |
|---|---|---|
| CN | 101226545 A | 7/2008 |
| CN | 103426119 A | 12/2013 |

(Continued)

OTHER PUBLICATIONS

Imad Afyouni, Cyril Ray, and Christophe Claramunt et al. (Spatial models for context-aware indoor navigation systems: A survey, Journal of Spatial Information Science, No. 4 (2012), pp. 85-123). (Year: 2012).*

(Continued)

*Primary Examiner* — Hafiz A Kassim
(74) *Attorney, Agent, or Firm* — Maschoff Brennan (57) ABSTRACT

Some embodiments of the invention relate to a method for an automated construction data interchange in a work information modelling system with a server means and a mobile client device built for establishing a communication link to the server means. The server means stores a general construction database with structured datasets of object entities of physical construction components with a hierarchical structure.

19 Claims, 6 Drawing Sheets

(56) References Cited

U.S. PATENT DOCUMENTS

| | | | | |
|---|---|---|---|---|
| 7,065,420 | B1* | 6/2006 | Philpott | G06Q 30/02 700/97 |
| 7,085,776 | B2* | 8/2006 | Callahan | G06F 17/50 |
| 7,127,308 | B2* | 10/2006 | Bigelow | G06F 17/50 700/97 |
| 7,526,358 | B2* | 4/2009 | Kawano | G06F 17/50 700/146 |
| 8,024,159 | B2* | 9/2011 | Sims, Jr. | G06F 17/50 382/113 |
| 9,043,346 | B2 | 5/2015 | Kim et al. | |
| 9,690,883 | B2* | 6/2017 | Nalluri | G06F 17/50 |
| 9,753,135 | B2 | 9/2017 | Bosch | |
| 2002/0010615 | A1* | 1/2002 | Jacobs | G06Q 10/02 705/7.15 |
| 2002/0013704 | A1* | 1/2002 | Finney | G10L 15/26 704/246 |
| 2003/0014212 | A1* | 1/2003 | Ralston | G01C 11/06 702/150 |
| 2004/0064436 | A1* | 4/2004 | Breslin | G06Q 10/06 |
| 2005/0246217 | A1* | 11/2005 | Horn | G06Q 10/06 705/7.18 |
| 2006/0028689 | A1* | 2/2006 | Perry | H04N 1/32144 358/3.28 |
| 2006/0044307 | A1* | 3/2006 | Song | G06Q 10/06 345/419 |
| 2006/0212327 | A1* | 9/2006 | Norman | G06Q 10/00 705/7.23 |
| 2006/0239186 | A1* | 10/2006 | Wu | H04M 3/42374 370/229 |
| 2006/0242154 | A1* | 10/2006 | Rawat | G06F 17/30126 |
| 2006/0242419 | A1* | 10/2006 | Gaffey | G06Q 10/06 713/176 |
| 2007/0095887 | A1* | 5/2007 | Barbosa | G06Q 10/06 235/375 |
| 2007/0288159 | A1* | 12/2007 | Skelton | G01C 15/00 455/556.2 |
| 2008/0065456 | A1* | 3/2008 | Labedz | G06Q 10/06 709/229 |
| 2009/0004410 | A1* | 1/2009 | Thomson | G06F 3/0481 428/29 |
| 2009/0070071 | A1* | 3/2009 | Wood | G06F 17/5004 703/1 |
| 2009/0119142 | A1* | 5/2009 | Yenni | G06Q 10/06 705/7.15 |
| 2009/0327024 | A1* | 12/2009 | Nielsen | G06Q 30/02 705/7.42 |
| 2010/0117654 | A1* | 5/2010 | Nielsen | G06Q 10/06 324/326 |
| 2010/0141445 | A1* | 6/2010 | Venkatasubramaniyam | G06Q 10/08 340/571 |
| 2010/0312605 | A1* | 12/2010 | Mitchell | G06Q 10/06 705/7.13 |
| 2011/0007076 | A1* | 1/2011 | Nielsen | G06F 17/30241 345/441 |
| 2011/0176179 | A1* | 7/2011 | Judelson | G06T 19/00 358/448 |
| 2012/0236030 | A1* | 9/2012 | Border | G02B 27/0093 345/633 |
| 2012/0330849 | A1* | 12/2012 | Nielsen | G06Q 10/06 705/301 |
| 2013/0198815 | A1* | 8/2013 | Piliouras | H04L 63/10 726/4 |
| 2014/0046729 | A1* | 2/2014 | Meyer | G06Q 10/00 705/7.32 |
| 2014/0192159 | A1 | 7/2014 | Chen et al. | |
| 2014/0268064 | A1 | 9/2014 | Kahle et al. | |
| 2015/0142498 | A1* | 5/2015 | Remacle | G06Q 10/06313 705/7.23 |

FOREIGN PATENT DOCUMENTS

| | | | | |
|---|---|---|---|---|
| CN | 103886139 A | 6/2014 | | |
| EP | 1 116 080 B1 | 1/2005 | | |
| EP | 2 629 210 A1 | 8/2013 | | |
| EP | 2698602 A1 | 2/2014 | | |
| EP | 2899501 A1 * | 7/2015 | | G01B 21/047 |
| JP | 5489310 B1 | 5/2014 | | |
| WO | 2012/162736 A1 | 12/2012 | | |
| WO | WO-2012162736 A1 * | 12/2012 | | G06Q 50/08 |

OTHER PUBLICATIONS

European Search Report dated Jul. 14, 2015 as received in Application No. 15153842.8.

* cited by examiner

WORK INFORMATION MODELLING

FIELD

The present invention relates generally to a method for automated construction data interchange, a work information modelling system, and a mobile client device.

BACKGROUND

In the art of general construction work such as building construction, civil engineering and in flexible factory environments for the production of consumer goods, planning, progress observation, documentation, appropriate accounting are important key factors. In many instances, those aspects are getting more and more complex and dynamic, in particular due to the many parties involved, fluctuating human and/or objective resources, increased complexity of the end results, tighter schedules, increased costs of human resources, etc. Work that was formerly planed and overseen by a single manager is nowadays too complex for a single person and a splitting between multiple people often miscarries at the thereby uprising interfaces.

It is therefore tried to expand automation and computerization in this technical field. For example, in the art of building construction EP 2 629 210, JP 5489310, CN 103886139, US 2014/268064 or US 2014/192159 are giving examples of so called BIM-System approaches. Or in another example from the art of assembly line factory environments, EP 1 116 080 or alike relate to a management of automated tools.

The technical problems therewith are multifarious. For example: Paper based orders might be outdated by the time they are issued to the executing entity; An immediate responses to and purposeful handling of the unexpected is required, wherein all the consequences to a desired schedule have to be considered to minimize impact; A detecting, handling and documenting of the done work has to be established, deviations from a planed schedule have to be documented, determined and handled. Therein, the existing dependencies are often too complex to immediately scope with, in particular for an on-site executing entity.

In particular, in view of the desired flexible and efficient usage of executing entities, in view of the demand for increased efficiency and tight schedules, or often practiced real time replacement and spare management of structural and human resources, improvements going further than the standard human usage of computer and mobile phones are demanded. Also, the documentation demands are increased, e.g. by the project owner or principal, by the contractors or suppliers for proving flawlessness, by insurances, by government bodies, for settlement of damages, for handling compensation claims, to enforce due contractual penalties, for commissioning, etc.

A human worker, as the on-site executing entity, is in particular demanded to consider above mentioned problems and pitfalls, whereas his main task would actually be to getting his work done.

SUMMARY

Some embodiments of the present invention may technically aid the on-site executing entity in getting his work done on-site, in particular in a way being efficient from an overall project view without needing to have all the knowledge of the overall desired result and coherences of the schedules. It is therewith also an object to technically enable a project manager and/or an owner of a desired construction in efficiently achieving the construction result, keeping track of progress, ensure sufficient and up-to-date documentation and a purposeful handling of unpleasant surprises.

Some embodiments interchange real world construction data, preferably to automate data exchange in a work information modelling system in an efficient way.

Some embodiments improve an automated construction data interchange in view of the required computational efforts and a reduced requirement for human interaction and observation.

Some embodiments provide a method being dynamic, flexible and allowing just in time monitoring, controlling and handling of uprising difficulties.

Some embodiments of the present invention relate to a method for an automated construction data interchange in a work information modelling system. The system comprises at least one server means, storing a general construction database and a mobile client device for a mobile executing entity having a variable place of action, which client device is built for establishing a communication link to the server means. The database of the server means comprises structured datasets of a plurality of object entities of physical construction components. Those datasets can comprise CAD information and attribute information of the object entities. The database provides a hierarchical structure of the object entities, which is representing a desired construction result to be established by the physical construction components, which can in particular be interpreted as a plan how to establish the real world desired construction result from the physical construction components, preferably with a digital representation or link to corresponding attribute information, e.g. in form manuals and/or guidelines for the physical construction components, information related to their desired handling, mounting, etc. The mobile executing entity can in particular be a human worker, but can optionally also be an automated or semi-automated tool with a variable place of action.

A step of the method according to the invention is surveying on-site spatial location information of the executing entity at its place of action. This involves location tracking of the executing entity by the mobile client device.

There is also the step of automatic filtering and preparing of a specific on-site task information with respect to a required handling sequence of one or more of the physical construction components by the executing entity that is required to progress toward establishing the desired construction result. According to the invention, this step is based on the structured datasets and the hierarchical structures of the construction database, an identifier associated with the executing entity and role associated to the executing entity, an actual time information and the on-site spatial location information of the executing entity. Optionally, also on-site spatial location information of the physical construction components already mounted and/or to be mounted, can be uses as basis for a filtering according to the present invention.

The method according to the invention is providing the specific on-site task information to the executing entity via the mobile client device, which is done with a dynamic updating of the construction database and of the specific on-site task. In a particular embodiment, the updating can be done online and in real time.

The automatic filtering can therein be done according to the on-site spatial location information of the executing entity and/or on-site spatial location information of the physical construction components by an automatic communication between the mobile client device and the server means via the communication link, preferably online and substantially in real-time. The automatic filtering can comprise an automatic generating of an online handling-, supply- and/or distribution-plan for the physical construction components, which can at least partially be provided to the executing entity.

Alternatively, the communication link between mobile client device and the server means can be at least occasionally offline. In this case, the filtering is done with a pre-work online communication, during which one or more of the specific task information are downloaded and locally stored at the mobile client device for offline access. Then the executing entity can at least occasionally be working offline on his specific task information, wherein resulting information of the specific task information is locally buffered by the mobile client device. When the client device can establish an online communication link, for example post-work, an uploading of the buffered resulting information upon establishing an online communication to the server means. In particular, the downloaded and locally stored specific task information for an offline usage can therein be downloaded in a higher detail level for a defined spatial area around the spatial location of the place of action and in a thereto compared lower detail level in adjacence of the defined spatial area.

The automatic filtering of the specific on-site task information can comprise an automatic generating of a list of physical construction components, auxiliary materials and tools needed for the specific on-site task information by the executing entity at its spatial location. In particular, an automatic filtering of this list for availability of its list-items at or in vicinity of the spatial location of the place of action can be comprised. This list or a subset thereof can be provided to one or more executing entities, preferably according to the specific roles of the executing entities.

The specific on-site task information can be presented to the executive entity in augmented reality, wherein in particular virtual views and/or video clips of the specific on-site task information and/or the desired construction result, which are preferably overlaid by dimension measurement information, handling sequences, interactive online manuals and/or links to an online help-, service-, spare-part-hotline, that are corresponding to the specific on-site task information and can for example origin and/or be filtered from the construction database, can be presented to a human executing entity.

The mobile client device can comprise a camera means for taking an image at the executing entities place of action and exchanging the resulting image to the server means for an online progress monitoring and/or a documentation as built. The camera means can not only be a camera for taking two dimensional images, but can in particular be a three dimensional camera means, e.g. a stereo imaging means, a TIM-camera, a structured light imaging means, a SLAM imaging means, a laser-scanning imaging means or the like.

In an embodiment, a tool of the executing entity can be automatically controlled and/or configured in real time based on the specific on-site task information. For example, a screwing tool of the executing entity can be automatically configured to a specific torque limit for the specific on-site task the executing entity (resp. the tool) is confronted with and afterwards automatically configured to a next torque limit for a next specific on-site task.

The mobile client device can comprise a location tracking system for surveying on-site spatial location information. For example, it can comprise a GNSS-receiver (like GPS, Glonas, Galileo, etc.), an image based location tracking system (e.g. a SLAM-Navigation, RIM-camera or stereo vision), an IMU and/or a radio navigation system (like an indoor GPS or location based on radio network base stations), one or more trackable reflectors or lights, a corner-cube for a laser tracker or a combination of at least some of those.

The physical construction components and/or the executing entity can comprise tags to be read out by machine, preferably from remote by the mobile client device. Those tags can for example be embodied as RFID-Tags or optical codes link barcodes, QR-codes or the like. In an advanced embodiment, the construction components and/or the executing entity can be recognized and identified by image processing of an image from a camera, with an identification of the construction components and/or the executing entity and optionally also an optical surveying to gain spatial location information about its location, orientation and/or size. In an example of an embodiment, location trackable RFIDs can be used, where the mobile client device can read out the tags of the physical construction components and/or the executing entity for the therewith associated identifiers and wherein the mobile client device can optionally also locate the tags with respect to the mobile client device. The locating of the tag (resp. the tag's carrier) can e.g. be based on their emitted radio waves and/or based on a location tracker associated with the tag, which provides location information to be read from the tag by the mobile client device.

The one or more mobile client devices can be tethering with other on-site devices and tools. For example, a mobile client device can establish one or more on-site near field mesh networks, and the client device can then function as a filtering gateway to the server means for other on-site devices that therefore are not required to be directly linked to the server means. In an embodiment according to the present invention, the mobile client devices can for example locally provide specifically filtered task information to the other devices and tools on-site, which are not having a direct online communication link to the server means—for example a simple measurement or working tool with low computational power and intelligence. Thereby, the mobile client device can e.g. compute a filtering of datasets from the database, based on the on-site spatial location information at the place of action and only communicate information that is actually relevant for the specific task information related to the present spatial location of the on-site tool or entity. The filtering result can then be provided to the tool or executing entity in a form that is handable by the tool or entity according to its role. This in particular avoids severe computation of complex structures in the on-site low level tools or at the server means and avoids a flood of non-relevant or unstructured data being transmitted to the executing entity. In the other direction of the communication, the mobile client device can gather readings, such as measurement values, etc. by a locally established network link from an executing entity or tool. By the client device, those reading can be filtered and optionally be supplemented with additionally information, such as e.g. the spatial location information of the mobile client device and/or one or more executing entities or tools and/or other meta-information. This filtered information is then provided via a global network to the server means for integration into the database. Preferably, the data exchange at the global and/or local network and in-between the two networks is done online and substantially in real time. For tools like a distance meter or the like, the local network communication can be event driven, for example, base on a triggering event like pressing a measure-button by the executing entity the tool can push its measurement values to the mobile client device.

The present invention also relates to an according work information modelling system for an automated construction data interchange, comprising one or more server means storing a general construction database, one or more mobile client devices for a mobile executing entity with a variable place of action, wherein each of the server means and the mobile client devices comprises at least one communication interface built to establish a data communication link of mobile client device and server means.

The general construction database comprises structured datasets of a plurality of object entities of physical construction components and a hierarchical structure of the object entities representing a desired construction result to be established by the physical construction components as desired work result. The system thereby establishes an online, real time bidirectional communication link by the communication interfaces of the mobile client device and the server means. The mobile client device comprises a surveying unit for location tracking of on-site spatial location information of the executing entity at its place of action and an automatic filtering unit, built to prepare a specific on-site task information for the executing entity to establish the desired construction result. The mobile client device is therein built to provide the specific on-site task information to the executing entity and to establish a dynamic and real time updating of the construction database and the specific on-site task. The filtered specific on-site task information can be based on an identifier associated with the executing entity and a therewith linked role associated to the executing entity, the structured datasets and the hierarchical structures of the database, an actual time information that is preferably synchronized with the server means and the on-site spatial location information of the executing entity and optionally also of the physical construction components According to an embodiment the invention, the automatic filtering can be done according to spatial location information of the executing entity and according to spatial location information of the physical construction components by an automatic bidirectional real-time online communication between the mobile client device and the server means via the communication link.

In another embodiment according to the invention, the communication link between mobile client device and the server means can at least occasionally be offline, for example in cases of a weak or none mobile link reception or in case of low bandwidth. The filtering can then for example be done with a pre-work online communication, during which one or more of the specific task information are filtered, downloaded and locally stored at the mobile client device for offline access. The executing entity can then work at least occasionally offline on his specific task information, wherein resulting information of the specific task information is locally buffered by the mobile client device. Upon establishing an online communication, e.g. post-work, the buffered resulting information is uploaded to the server means.

In a special embodiment, the downloaded and locally stored specific task information is downloaded in a higher detail level for a defined spatial location of the desired place of action for the executing entity as filtered from the database, and in a thereto compared lower detail level in adjacence of the defined spatial area, for example for the rest of the worksite.

The automatic filtering of the specific on-site task information can for example comprise an automatic generating of a list of physical construction components, auxiliary materials and tools needed for the specific on-site task information. Therein, an automatic filtering of the list for availability of its list-items at or nearby the spatial location information of the place of action, and providing the list or a subset thereof to one or more executing entities according to the executing entities role can be comprised. The filtering can for example also comprise an automatic generation of an online material handling-, supply- and/or distribution-plan.

The mobile client device can comprise a camera means for taking images of the executing entity and/or the executing entities on-site environment at its place of action. The resulting images can be provided to the server means, wherein the images are automatically assigned to corresponding object entities of the database according to the on-site spatial location information and/or according an image-recognition and/or fitting with respect to CAD-data of the object entity from the database.

A human executing entity can be equipped with a camera that is comprised in glasses, a helmet, ear protection, or safety glasses. The camera is built to provide image information to the mobile client device, wherein the camera can comprises a two dimensional camera means and/or a three dimensional camera means—like a stereo imaging means, a structured light imaging means, a SLAM imaging means and/or a laser-scanning imaging means.

The mobile client device of the system can therein be built to establish a local mesh network with on-site tools by a local communication interface of limited range, which can for example be used for exchanging real world measurement information. The filtering unit is therein built to automatically filter information that is exchanged in-between the on-site tools and the datasets of the database according to the on-site location information.

The invention especially relates to a mobile client device built for above system and method which can in particular comprise a camera unit, built to take images and/or videos of the on-site location. For example, this camera unit can be comprised in a personal protective equipment for a human executing entity, preferably in a helmet, safety glasses or ear protection.

The system according to the present invention comprises microcontrollers, microcomputers, DSPs or a programmable or hardwired digital logics, wherefore the present invention can involve a computer program product that is stored on a machine readable medium or embodied as electromagnetic wave (such as e.g. a wired or wireless data signal), which implements functionality according to the invention in software—which therefore is also an embodiment of the invention.

The computer program product comprises program code being configured to execute and operate an automatic filtering of specific task information from a construction database based on spatial location information and a role of an executing entity as discussed in this document. In particular, the program code can be carried out on a digital computation unit of a mobile client device of a system as presented herein.

BRIEF DESCRIPTION OF THE FIGURES

Devices, methods and setups and computer programs according to the invention are described or explained in more detail below, purely by way of example, with reference to working examples shown schematically in the drawing. Specifically.

DETAILED DESCRIPTION

The diagrams of the figures should not be considered as being drawn to scale. Where appropriate, the same reference signs are used for the same features or for features with similar functionalities. Different indices to reference signs are used to differentiate between different embodiments of a feature which are shown.

Figure 1:
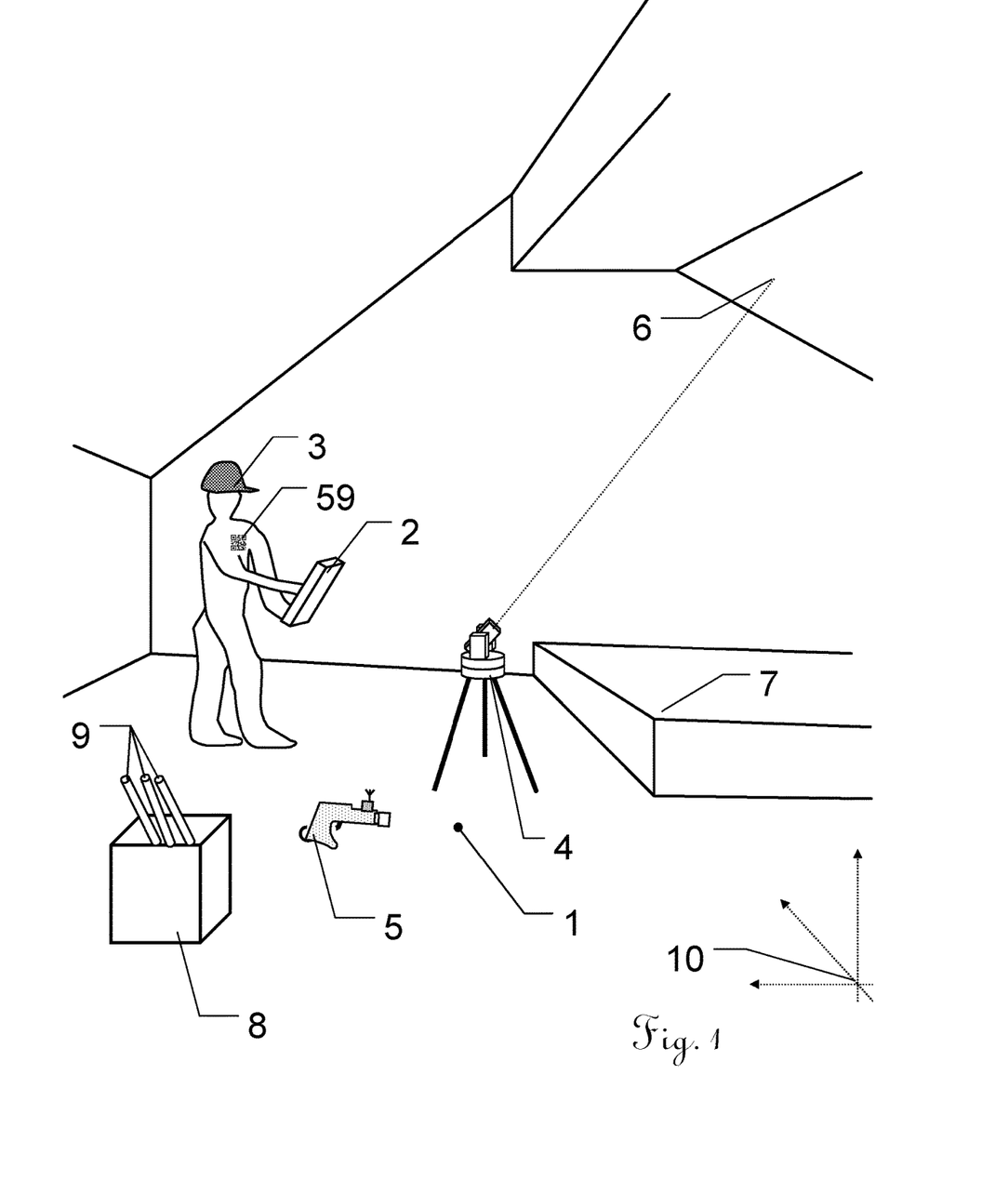
FIG. 1 shows an example of first embodiment where the present invention is applied at a worksite.

FIG. 1 shows an embodiment of an example of the present invention at a building construction worksite as place of action 1. The executing entity, which is here shown as a human worker 3 has a mobile client device 2 that is built to establish an online communication link to one or more here not shown server means. This server means is storing a general construction database, comprising structured datasets ob virtual object entities according to physical construction components at the worksite and ca be located remote from the place of action 1. The datasets can in particular comprise CAD information of the physical construction components of which the desired construction result will be established. Beside those CAD data the database can also comprise other attribute information of the physical construction component, like supply information, prices, variants, manuals, orders, order confirmations, accounting information, and when the construction components are handled by the executing entity 3 also information like actual serial or lot numbers, manufacturing dates, mounting dates, information about the executing entity 3 and the tools and auxiliary material used, etc.

The object entities are in a hierarchical structure, which structure represents the desired construction result. This hierarchy can for example involve information of the desired linkage of the physical construction components and how to achieve this linkage, e.g. special assembly sequences, tools required, etc. for example comprising auxiliary materials, structural components, pre manufactured sub-assemblies, assemblies, sections and so on, up to the overall desired construction result. This database can e.g. be managed and provided by a construction engineer, architect, designer, site supervisor, project owner, but can also be accessed by accounting, contracting partners, suppliers, conveyances, etc.

The executing entity can not only be a human worker 3 but can also be an automated or semi-automated tool 4,5. For example, a tool 5 embodied as a powered screwdriver, drill, etc. which can optionally be parameterized in its functionality, e.g. by defining a screwing torque, a drilling depth, etc. In another example, the executing entity can also be a tool 4 for indicating a desired on-site location by light projection or by indicating a desired movement of the tool 4,5 that is required to reach a desired on-site location. For such non human executing entities, the mobile client device can be comprised in the executing entity or the executing entity can provide a communication link to the client device. The client device can be built to spatially locate the executing entity 3,4,5. Exemplary shown are executing entities embodied by the human worker 3, with the mobile client device 2 in his hand, the parametrizable electric drilling tool 5 and the coordinate controlled pointing laser 4, that can be configured to survey spatial location information at the place of action 1, project an indication at defined location at the place of action 1 and/or survey mobile client devices, executing entities 3,4,5 and/or construction components. One or more of the executing entities 4,5 and/or the executing entity's mobile client device 2 can comprise a camera means for taking images or videos.

One or more of the mobile client devices are equipped with means for location tracking to gather on-site spatial location information of the executing entity 3,4,5. This can involve a tracking of the spatial location information of the mobile client device itself and/or can also involve a tracking of locations of other executing entities by the mobile client device or by an on-site tool with a communication link to the mobile client device. The client device therein also relies on information from the construction database comprising of on-site spatial location information stored by other mobile client devices or from the hierarchy of the object entities in the database. For this purpose, the mobile client device can be equipped with location tracking unit which can e.g. comprise a GNSS-receiver (such as GPS, Galileo or Glonas), a wireless network base location unit (e.g. according to signals from wireless base stations or therefore installed radio beacons, AKA local GPS) or based on optical navigation approaches (such a SLAM-Navigation, 3D-cameras, stereo-vision, visual object recognition, and/or a Inertial Measurement Unit) or any combination thereof.

Also shown in the figure, is a package 8 which was previously delivered by another executing entity to the worksite to its specific desired place of action, defined by on-site spatial coordinate information. According to the invention, the executing entity for delivering therefore had a mobile client 2 device directing him to the spatial location coordinates at the place of action, where this package 8 should be dropped—which was provided to the executing entity having the role for delivery as special task information by his mobile client device 2 at a certain time to be present for the shown executing entity 3 who requires the package 8 for his special task information. For example, those spatial coordinates were provided from construction database when the package content 9 was ordered by another mobile client device, based on automatically filtered information from the database related to the spatial location information of the place of action 1. In another example, spatial location information on where to drop the package 8 can be filtered by the mobile client device of the delivering entity via a communication link to the construction database, which can according to the invention be automatically filtered for this information based on a role associated to this executing entity as delivering entity and on the content 9 of the package 8 that is—according to the construction database— desired at those spatial coordinates, because another executing entity 3—having the role of a certified electrician—is automatically filtered from the database to be given the task to mount the content 9 at the nearby spatial location 6, as described below. In the filtering, there is also an actual time information comprised, for scheduling the specific on-site tasks in accordance with the database and/or for documentation of the specific task being done in time, which can automatically be determined by the mobile client device when the executing entity in the role of delivery has reached the spatial coordinates given with the specific on-site task. In a special embodiment, the mobile client device can detect a moving away of the delivering entity from the package 8, which package can also be considered as an executing entity, that is given the role of containing.

The in this figure shown executing entity 3 is associated a role of an electrician. As multiple executing entities 3 can be associated with the same role, he also has a unique identifier, e.g. comprising the workers particulars. The role is linked with the identifier, wherein it is possible for an identifier to be associated with multiple roles, if the corresponding executing entity 3 is applicable and/or skilled in multiple roles. This link of role and identifier can also be accessed from the database, from the executing entity itself and/or its mobile client device. The mobile client device can therefore be built to identify the executing entity. For example, a personal mobile client device 2 of an executing entity 3 can be associated to this certain entity 3 or the mobile client device can identify the executing entity, which can e.g. be done by a login, a fingerprint, image recognition or by a tag carried by the executing entity, like a RFID, Barcode, QR-Code or the like. Such a tag 59 or login can for example comprise the identifier of the executing entity and/or one or more associated roles—providing information, for which tasks the executing entity 3 is skilled, certified or built—or other information. There can also be provided a link to an online database comprising those in formations, e.g. to database entries of workers and/or tools of a contractor that the executing entity is belonging to.

As mentioned, according to the invention, the mobile client device is built to establish a location tracking of the executing entity with a surveying of on-site spatial location information about the location of the executing entity, at its place of action 1. This can comprise a determination of the location of the mobile client device 2 itself and/or of the location of remote executing entities by the client device. For example, the surveying of the executing entity 3 can be established by the mobile client device 2 attached to the executing entity 3 or the surveying can be established by a location tracking unit attached to the executing entity 3, which unit is surveying its location and is providing on-site spatial location information via a communication link to the mobile client device.

The mobile client device according to the invention is built to establish a bidirectional communication link to the server means. By this link, it can access the structured datasets and their hierarchical structures in the construction database. The communication link can in particular be online and can provide a bidirectional real time communication.

According to the invention, the mobile client device computes an automatic filtering and preparing of a specific on-site task information for the executing entity. This specific on-site task information can be described as a required handling sequence for one or more of the physical construction components by the executing entity to establish the desired construction result—respectively a single step of such a handling sequence directed towards the achievement of the desired construction result. This automatic filtering is done based on the on-site spatial location information of the executing entities at the place of action, the identifiers and the roles of each of those executing entities, the actual time and based on the structured datasets and the hierarchical structure in the construction database. In particular, the filtering comprises a filtering of the structured datasets based on the location defined by the surveyed on-site spatial location information. The spatial location information can for example be related or transformed to an on-site coordinate system 10, whereto also the locations of the construction components for the desired construction result can be referenced and/or measured.

The thereby automatically generated specific on-site task information is then provided to the executing entity by the mobile client device, wherein the mobile client device can update the construction database and the on-site specific task information in real time.

By this automatic filtering, the executing entity 3 gets provided the specific task related to the on-site spatial location information of his place of action by the mobile client device 2. A task can e.g. be to mount the content 9 of the package 8 at the spatial location 6. The identification and role of the executing entity 3, can also comprise further attribute data and meta information about the executing entity 3, for example a workers skill level, if he has previously done the same task, his average efficiency, his success rate, his mother tongue and language skills, previously occurred problems, etc. The automatic filtering can also include this information and can e.g. provide a novice executing entity 3 with an exhaustive mounting manual (comprising details about every step) for the content 9 from the database, whereas an experienced executing entity 3 might not be bothered by information he is already aware of and will be provided with a brief mounting instruction only comprising the crucial steps. The mobile client device can also monitor the execution of the provided on-site task based on the on-site spatial location information. For example, to check whether the executing entity picks up the correct content 9 from the actual location of the package 8, if he is actually working at the correct location 6, if he uses the correct tools 5, if the time spent there is reasonable for the given specific on-site task, online-check if a planed schedule is reasonable or if measures are to be taken, etc.

Based in the spatial location information in combination with the role and/or ID of the executing entity, the mobile client device according to the invention can automatically filter what kind of equipment is needed for the specific on site-task. Therein the mobile client device can automatically generate which tool, resources, construction components, auxiliary materials etc. are needed and in particular which of those are available at or nearby the spatial location of the place of action or which are to be brought by this or another executing entity. For example, the mobile client device can—based on the spatial location information from the database—e.g. also filter that due to the pedestal 7, the executing entity with its corresponding ID will be able to reach the mounting position 6 (e.g. as he is tall enough to reach position 6), whereas otherwise or for another executing entity, the mobile client device 2 can automatically filter the specific on-site task of bringing a ladder of sufficient height with him before he is on his way to the place of action. In another example, the executing entity with the role of a painter, who worked previously at this spatial location, erected a gantry. He has not been given the specific task to take the gantry down by his mobile client device but to leave it, as the client device filtered that the succeeding executing entity, having the role of an electrician, will need to work at the same spatial location and can reuse the gantry. The mobile client device of the electrician can thereby filter and provide a specific task information to use this gantry. After the electrician finished, the painter will be provided with the specific task to take down the gantry and erect it at another location or remove it from the site.

In an embodiment according to the invention, the drill tool 5 can not only be an ordinary standard tool, but can be a semi automated tool which can be considered as an executing entity of a specific role for a specific task. For example being semi automated tool providing an automatically adjustable end stop for the drilling depth and/or a detection of the actual drill diameter, etc. Such a non human executing entity 4,5, can comprise a mobile client device 2 or it can be built to establish a communication link with an external mobile client device 2. Either way, according to the invention, the mobile client device will again filter the datasets according to the spatial location information of the entity and provide a specific on-site task information, e.g. by configuring the end stop, setting an optimized rotation speed for the specific on-site task and/or issue a warning or lock down the drill 5 if a wrong diameter is used or if the surveyed spatial location information of the executing entity does not match those of the specific on-site task information filtered from the database, etc.

Another example of an executing entity can be the location pointer and/or 3D measurement tool 4, which can comprise a mobile client device being online with the database, and/or being in communication with a nearby mobile client device 2 by a local wired or wireless link, e.g. as explained in the example further below. A location pointing tool 4 comprising the mobile client device can in particular be considered as a master mobile client device at a place of action, as it can (due to its measurement functionality) spatially reference itself to the already established construction components and/or can survey other executing entities, construction components and/or desired location for a specific on-site task in the on-site coordinate system 10. In the shown example, this tool 4 is pointing a laser to the desired location, the executing entity 3 is given the specific on-site task to mount the construction component 9 which is content 9 of the package 8. For this task, the human executing entity 3 has to use the non-human executing entity 5 to drill a hole.

Figure 2:
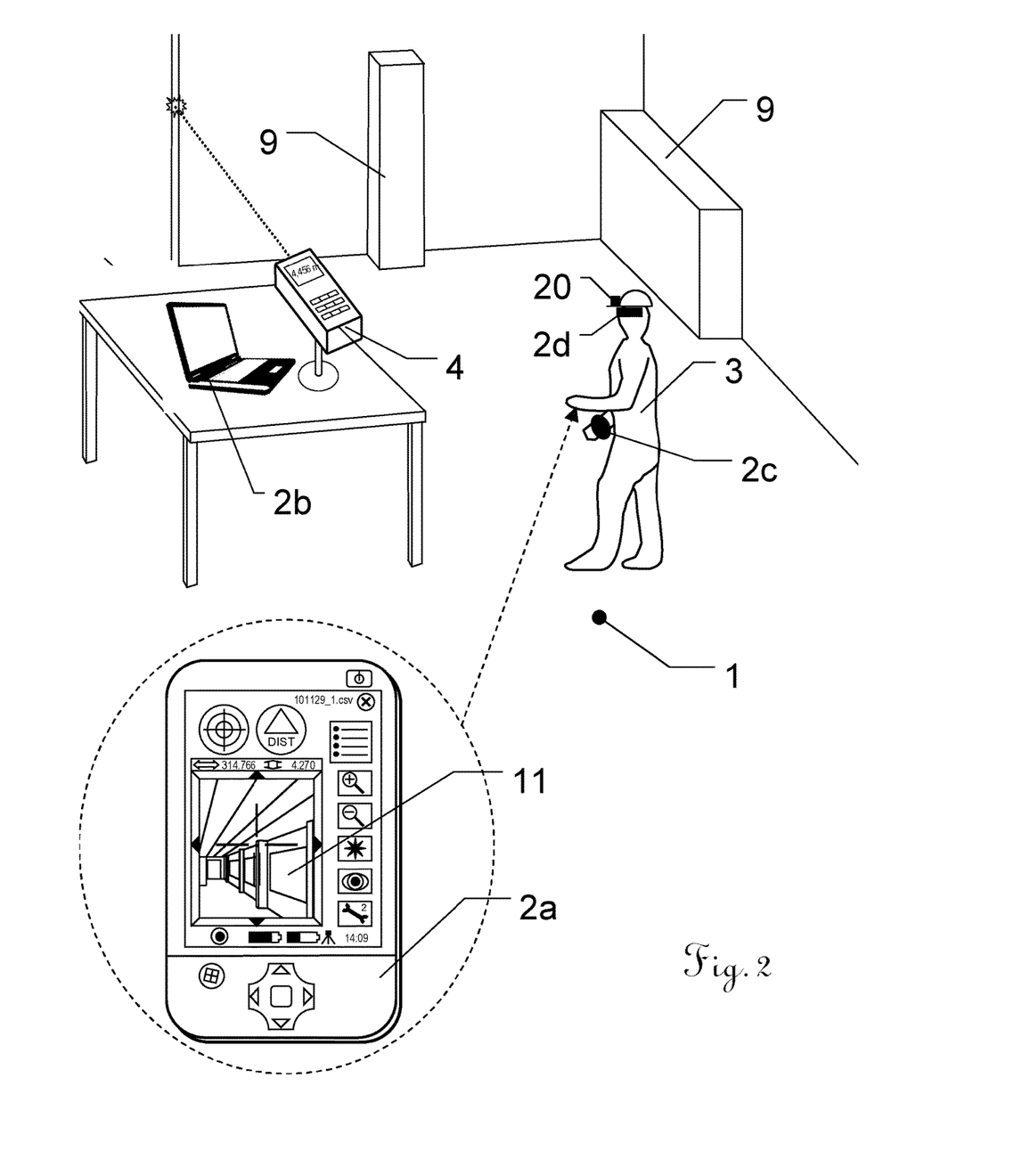
FIG. 2 shows an example of a second embodiment according to the invention at a place of action.

FIG. 2 illustrates another embodiment according to the invention. At the place of action 1 there is a human executing entity 3, having a mobile client device that is linked to a here not shown remote server means via internet. The server means comprises a database with datasets of object entities according to physical construction components 9 at the place of action 1.

The on-site spatial location information of the executing entity is surveyed and an identifier of the executing entity is determined. Based on this information, the mobile client device is filtering the database, which results in one or more specific on-site tasks which are presented to the executing entity 3 by the mobile client device. The mobile client device can be a handheld variant 2a, a computer unit 2b, a smart watch 2c, virtual or augmented reality glasses 2d or can be integrate to a non-human executing entity, such as an on-site measurement system like a laser scanner, a laser tracker, 3D camera, a 2D camera, a laser or image projector, a device like in EP 2 698 602 (preferably with automated movements), etc.

The mobile client device can provide the specific task information in different forms. For example, in form of a task list, by providing virtual renderings based on the construction database information, by images, by videos, by animations and/or by augmented reality. The provided specific task information can comprise information from the database about the task, e.g. involving measurements, descriptions and/or animations of certain steps of the task, etc. An example of a rendered and augmented view can be seen on the screen 11. In addition or alternatively, the specific task information can for example be also at least partially be provided acoustically e.g. sounds or by voice and the mobile client device 2 can also provide a keyboard, a touch-screen, and/or a voice recognition interface for gathering input from the executing entity 3.

The here shown example of a specific on-site task is the installation of the construction components 9, which are here shown as cabinets, but can also be any other construction component in another specific on-site task. From the database, the mobile client device filters the exact on-site location at which the physical components 9 have to be installed to achieve the desired construction result. For example the screen 11 can show a rendered view of the desired construction result, supplemented by a distance information defining the installation location with respect to already installed construction components from the database, e.g. like already built walls, etc. It can also show a view of an on-site camera, where a virtual rendering of the construction component 9 is overlaid at the desired location so that the executing entity can confirm its correct work result when looking at the screen. In addition or alternatively, the mobile client device 2 can also establish image recognition to determine the actual placement of the construction component 9 in the camera image as on-site spatial location information and store this information with or without the image in the database for documentation. The mobile client device can thereby e.g. confirm work-done to the database and/or the executing entity and provide a next specific on-site task for the executing entity, or otherwise prompt the executing entity 3 to apply corrections.

In the figure, there is also a tool 4, built to be linked to the mobile client device 2a, 2b or 2c by a local communication interface—which means that the tool 4 is not directly linked to the server means. Therein, the mobile client device dose a filtering of data from and to the database based on spatial location information, so the datasets at the server are accessed efficiently and directly according to their spatial location coordinates at the place of action. The here shown tool 4 can point a measuring laser so the executing entity can measure distances and/or angles related to his special on-site task. By the laser, the tool 4 can also project light to an exact desired on-site location, at which the specific on-site task has to be done. In the shown embodiment, the executing entity 3 wears a helmet which comprises a camera 20, which provides its images to a mobile client device 2a,2b,2c, e.g. by wireless link and/or which helmet can comprise the mobile client device together with the camera. In addition or alternatively, also the tool 4 can comprise a camera for imaging its working area.

For example, the worker 3 as executing entity has a tool like an e.g. electronic distance meter, an electronic level or the like for gathering on-site real world measurement data like dimensions, level information, etc. This tool can establish a low to medium range local communication link, e.g. by Bluetooth, ZigBee or the like, for example within an on-site range of the present place of action, e.g. within some tens of meters, a room or section of a building or a worksite. The local communication link is established to the also on-site mobile client device, for example in form of a static or dynamic local mesh network to exchange configuration and/or measurement data. The mobile client device can then e.g. provide a specific task to an executing entity to measure a just installed window (as physical construction component) by means of the tool. By the on-site spatial location information of the executing entity, the mobile client device can associate the measurement to the physical construction component and to the corresponding object entity in the database. In addition or alternatively, the mobile client device can survey on-site spatial location information of the tool itself. If the worker is the issuing the measurement, the local communication link can provide measurement values such as a distance, and/or an orientation of the measurement tool online and in real time. The mobile client device can filter this information as pre processing and e.g. determine if a (sufficiently) horizontal and/or sufficiently vertical dimensional measurement was taken and at which spatial location and accordingly at which physical construction component entity. For example, if the measurement does not correspond to the specific on-site task given to the executing entity, the mobile client device can right away detect this and advice the executing entity to redo the correct measurement.

If multiple measurements are to be done, the mobile client device can provide certain flexibility in the order of the specific task, as long as the order does not conflict with a strictly demanded sequence, which the client device can automatically filter from the construction database it is linked to. In such a pre-processing or automatic filtering of the mobile client device, the information can be condensed and/or supplemented before entered into the construction database. The automatic filtering can also comprise an automatic assigning of the measurement data to the corresponding object entities and spatial location information of the database by the mobile client device. The pre-processed information is then online and in real time updated at the database. A remote executing entity and/or a project owner or manager can online access this information. Then, e.g. the same or another mobile client device can thereupon automatically filter a subsequent specific task to be done next, wherein also the just take measurement can be involved—for example ordering a glass fitting to the just measured window and/or delivering the glass to the place of action based on the on-site spatial location information. The online link from the mobile client device to the server means can therein be established by a global network of wider range, e.g. linked to the internet, like by means of a wired or wireless LAN, a VPN-network, and a mobile link like UMTS, GPRS, or the like.

Figure 3:
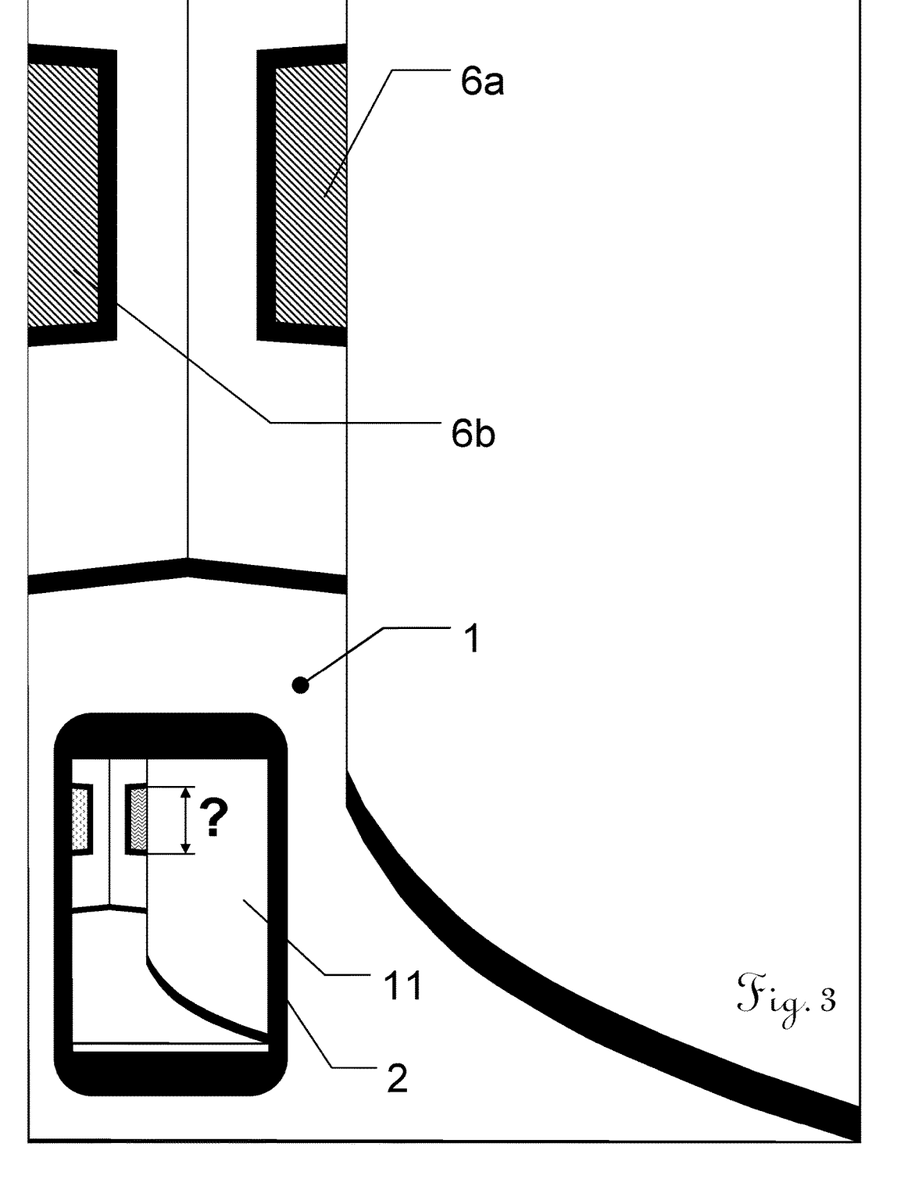
FIG. 3 shows an example of a third embodiment where the present invention is applied at a construction site.

FIG. 3 shows an example of an embodiment according to the invention, where an executing entity 3 with a role as a window fitter has a mobile client device 2 at the place of action 1 at a worksite. The mobile client device 2 gathers on-site spatial location information as discussed before. Based on the on-site spatial location, the mobile client device provides the executing entity 3 a specific on-site task information, which the client device 2 filters from the database at the server means via a (preferably real-time online) communication link. The specific task information is shown to the execution entity by virtual information on the screen 11. The mobile client device 2 can be equipped with a tag reader for optical and/or RFID tags 59, whereby it can identify the executing entity 3 and/or the on-site physical construction components around it. The shown embodiment of the client device 2 comprises an optional camera 20, which allows visual inspection, visual surveying and/or capturing images for documentation purposes. In a special embodiment, the mobile client device can also evaluate a location of the physical construction components around it, e.g. by radio location and/or by visual location. In the shown example, a specific task can be to fit the physical construction components in form of two windows 6a and 6b correctly. This task can automatically be further split up to a hierarchical sequence of more detailed specific on-site task information, which the mobile client device according to the invention automatically filters from the database.

If the fitting of the windows require work from the outside of the shown walls, another executing entity, e.g. operating an outside crane or scaffold also having a mobile client device, can collaborate with the inside executing entity, as both of the client devices are online linked to the server means for exchanging data. Based on their respective spatial location information, the mobile client devices will automatically filter according specific on-site task information for each of the executing entities from the database and provide it. Thereby there is no need for direct communication between the executing entities, which can be tricky, e.g. in view of a remote crane operator, noisy environments, etc. In case of different languages of the executing entities, the automatic filtering according to the invention can provide each executing entity with the specific on-site task information in his preferred language.

According to the invention, the automatic filtering and communication of the mobile client devices can also be used to result an exact documentation of the work that has been done, as the datasets of the database are online supplied with up to date information, that is—due to the filtering of the mobile client devices—directly associated to the corresponding object entities and executing entities, e.g. measurement values, images, etc.

Screen 11 in the figure shows an example of a special on-site task information for the executing entity 3 to measure a certain dimension. The executing entity 3 therefore turns on his electronic distance meter 4, which locally connect to the mobile client device, e.g. by Bluetooth. Then, he moves to the desired location at the place of work 1 as indicated by the mobile client device 2, and executes the measurement with his tool 4. The measured distance value is communicated from the distance meter 4 to the mobile client device 2, which also surveys on-site spatial location information of the on-site location where measurement was taken. The mobile client device 2 filers those data and enters it, if possible by an online link in real time, to the database. Then it automatically filters the database again for this spatial location and provides another specific on-site task information, which can e.g. comprise to apply some modifications at the location of the just taken measurement—as the measurement value was not satisfactory, to progress with the step of inserting an indicated window—shifted an inch up to be correctly placed according to the just taken measurement, to move to other nearby spatial location coordinates when the work here is done, etc.

Figure 4:
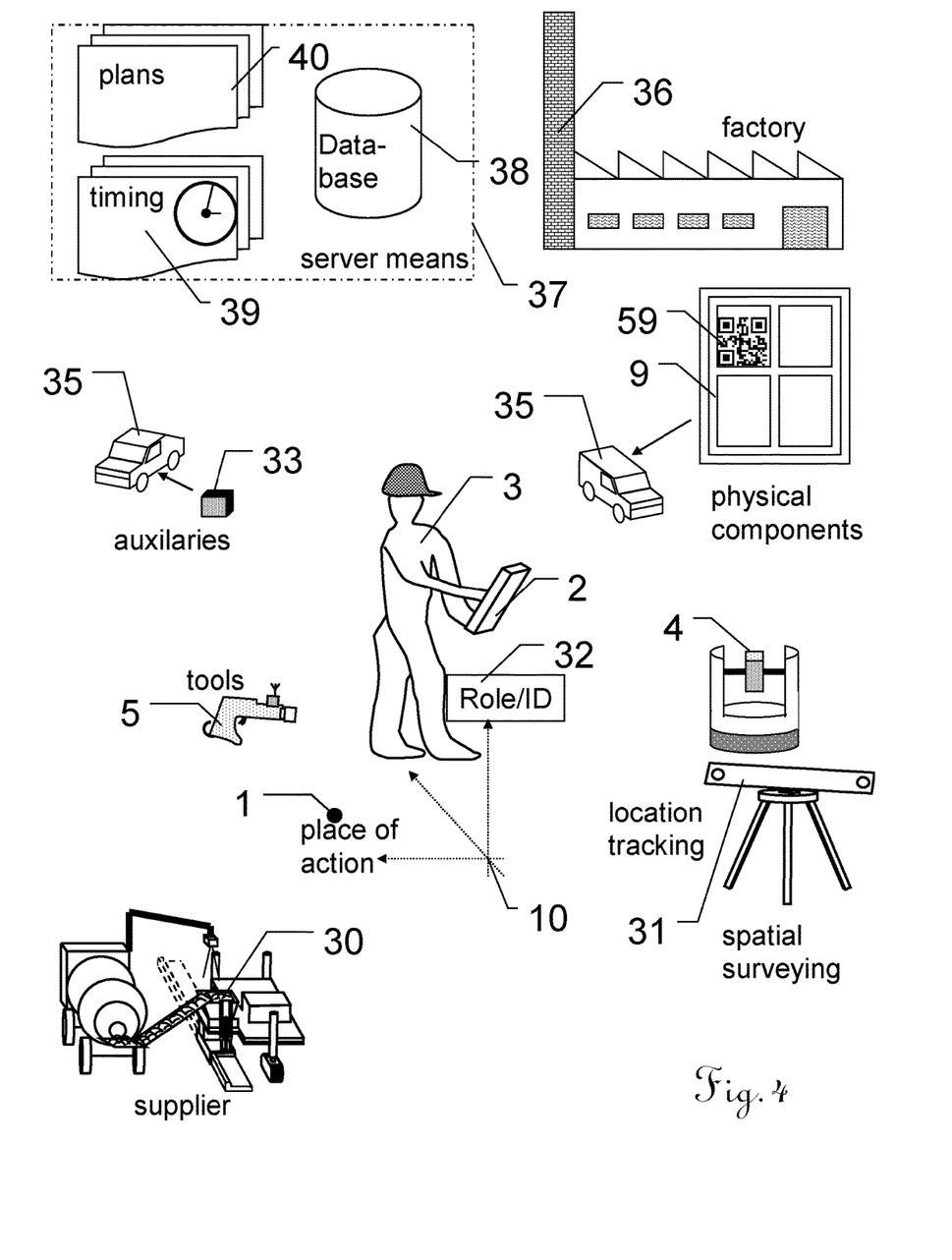
FIG. 4 shows an example of a schematic diagram to describe the present invention.

FIG. 4 shows an example of a functional diagram of an embodiment according to the invention. The executing entity 3 and its mobile client device 2 shown in the middle are surrounded by entities and items for which and/or with which, construction data interchange according to the invention can take place. The executing entity 3 has a role 32 and/or ID 32 associated to it. There is a server means having a database 38 with datasets in a hierarchical structure that corresponds to a desired construction results. Therein, the physical construction components 9 are represented by object entities of the datasets, which can comprise plans 40, in particular CAD data and attributes of the object entities like component information, accounting information, supplier information, manuals, or any other metadata related to the construction component and being of relevance for the execution and/or documentation of the establishing of the desired construction result. Therein, some of those metadata will be generated and/or adapted online and in real time during the establishing of the desired construction result based on on-site information filtered and provided by the mobile client device 2, like a the example shown time-schedule 39. Apparently, there can be multiple server means and/or databases, which can also reside at different locations.

Involved in the communication can e.g. also be one or more factories 36, which can be a special kind of executing entity, given a role to produce the physical construction components 9, preferably just in time, so the planed time schedule 39 can be redeemed. For this, there can be a mobile client device directly associated to this factory or to an executing entity, which is having the role of sourcing, has a mobile client device that is filtering the database 38 for the required supply according to a role and location of the factory 36 and provides the resulting specific task information to the factory 36.

Also shown are the resulting construction components 9, which can have tags 59 to identify and/or locate them. Also, an executing entity 35, having the role of a conveyance, can have a mobile client device according to the invention, which is automatically filtering the database 38 based on spatial location information—in this case based on the pick-up and destination places of the physical construction components 9 and the desired time schedule 39. The same principle can be applied for suppliers of standard auxiliary materials 33 and/or tools, as well as for a company, where the shown executing entity 3 is employed. The mobile client device according to the invention automatically filters the construction database 38 for the required components, auxiliaries and executing entities at the spatial coordinates at the place of action and provides according specific on-site tasks to fulfil the demands. The mobile client device can therein automatically react upon any shortcomings or delays according to the entries of the database 38 automatically made by the other mobile client devices, and e.g. automatically adopt the schedule or alarm a human project manager to manually interact, if the automatic filtering of an alternative fails or is ambiguous.

The present invention is therein based on spatial location information, wherefore the mobile client devices 2 are built for location tracking and surveying, which can be done by the various approaches described herein. This location tracking and the resulting spatial location information, indicated by the coordinate system symbol 10 at the place of action 1, is a basis for the automatic filtering by the mobile client devices according to the present invention, on which the data interchange in the work information modelling system relies upon. This fact is symbolized by the example shown surveying devices 4,31, which can integrated in a mobile client device and/or be external from the mobile client device and provide spatial location information to the mobile client device 2 via a communication link.

The shown tools 5 can at least partially also be considered as executing entities on their own, having their specific roles. In particular, if they are automated or at least partially automated, they can have an integrated mobile client device or they can be built to establish a communication link to an external mobile client device 2 of another executing entity 2. As described above, such a tool 5 of the executive entity 3 can be automatically controlled and/or configured in real time based on the specific on-site task information, e.g. by setting torque limits, operating an automatic tooltip-changer, cutting depth adjustment, etc. Also, a supplier like the shown precast concrete factory 30 can be included in the automated construction data interchange according to the invention.

Figure 5:
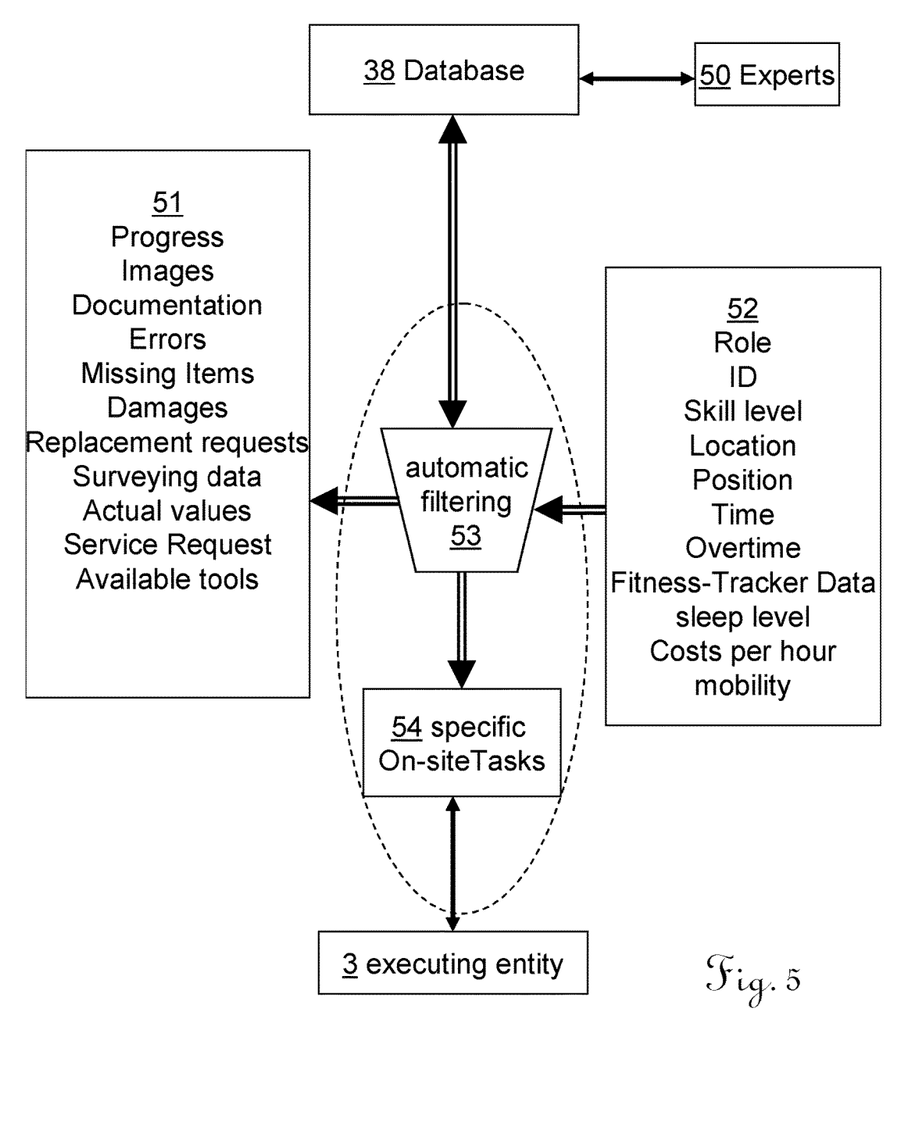
FIG. 5 shows an example of a data flow diagram according to the invention.

FIG. 5 shows an example of a data flow diagram of an embodiment of the present invention. In the centre there is again the automatic filtering 53 mobile client device 2 built for establishing a link to the database 38 at the server means and for automatically filtering 53 one or more specific on-site task informations 54 for one or more executing entities 3, based on spatial location information, a role of the executing entity, time and information from the database 38. The database 38 can be managed by a human supervisor 50, in particular by a special version of a mobile client device 2, which is not related to its actual on-site spatial location information but on virtual and/or global spatial location information.

In the left box 51, there is an incomplete list of examples of outputs from the automatic filtering 53 according to the present invention. The outputs can for example comprise one or more of: a progress of the executing entity with the specific on-site task it is confronted with, images of the specific on-site task (in particular at the beginning and at the end of the task, but also in-between like at each of the smallest sub-step of the specific on-site task that is provided to the executing entity), a documentation of the execution of the on-site task, a record errors and/or deviations that might occur, an indication of missing items at the place of action, a documentation of damages of the construction components, a request for replacement of a damaged construction component and/or working tool, surveying data of installed and/or to be installed the construction components, actual values measured at the place of action respectively deviations from planed desired values according to the construction database, service requests for on-site tools, a list of tools, construction components and/or auxiliary material available at or near the place of action, a list of tools, construction components and/or auxiliary material to be brought to the place of action by the executing entity, etc.

In the box 52 on the right, there is an incomplete list of examples of inputs, on at least part of which the automatic filtering 53 according to the present invention can be based in addition to the surveyed spatial location information. For example, at least one of a role of the executing entity, an ID of the executing entity and/or of a construction component, a skill level of an executing entity, an actual time information, overtimes of the executing entity, fitness-tracker data from the executing entity, respectively its fitness state, the executing entities sleep level and/or heath state, costs per hour of an executing entity and/or of a tool, mobility of the executing entity and/or tool, etc.

Figure 6:
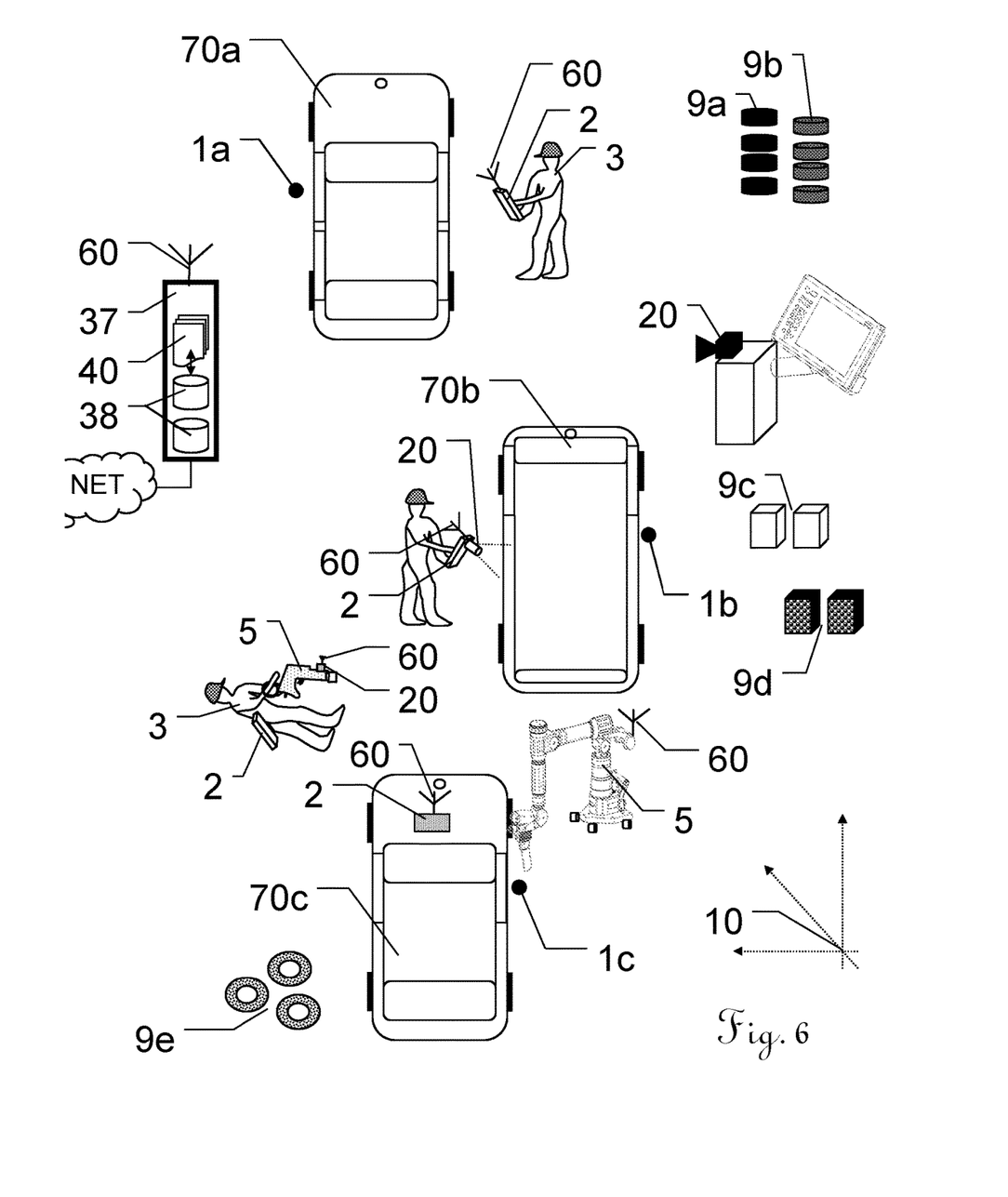
FIG. 6 shows an example of a fourth embodiment according to the invention at a fabrication site.

In the embodiment of FIG. 6, there is a factory environment shown as place of action 1a,1b,1c according to the present invention, in particular a flexible factory environment. The executing entities 3 and their shown mobile client devices 2 are mobile, and not fixed to a certain station such as in a static assembly line or with fix installed robots. According to the invention, the mobile client devices 2 are automatically filtering specific on-site task information from the database 38 of the server-means 37 and providing them to the executing entities 3 as described above with reference to construction work. The mobile client devices 2 are linked to the server means 37 by the communication interfaces 60, which are here embodied as wireless network interfaces. The desired construction results 70a,70b,70c to be established by the physical construction components 9a,9b,9c,9d,9e are not fully equal, so the specific on-site task information is automatically filtered from the database 38 base on a role of the different executing entities 3 and based on spatial location information 10 of the place of action 1a,1b,1c. Beside the human executing entities 3, there are also non-human mobile executing entities 5 shown which comprise a client device, like a semi-automated, configurable screwing tool or an automated fixing tool. There are also some cameras 20 for imaging the done work and/or for visual surveying.

Another embodiment could be a nurse in a hospital delivering medicine, recording temperature, motion, blood pressure, etc. or a hostess, providing food and drinks in bus/plain/train, or a welder in a shipyard with a sheet metal supply where the mobile client device is online observing welding position, welding current, electrode feed rate, locations of angle grinder actions, etc.

A skilled person is aware of the fact that details, which are here shown and explained with respect to different embodiments, can also be combined with details from other embodiments and in other permutations in the sense of the invention.

What is claimed is:

1. A method for an automated construction data interchange in a work information modelling system, with
    at least one server means, storing a general construction database, the database comprising:
        structured datasets of a plurality of object entities of physical construction components, wherein the datasets comprise CAD information and attribute information of the object entities, with
        a hierarchical structure of the object entities representing a desired construction result to be established by the physical construction components and
    a mobile client device for a mobile executing entity with a variable place of action, built for establishing a communication link to the server means;
the method comprising:
    surveying on-site spatial location information of the executing entity at its place of action by location tracking of the executing entity with a location tracking system at the mobile client device,
    computing an automatic filtering and preparing of a specific on-site task information with respect to a required handling sequence of one or more of the physical construction components by the executing entity to establish the desired construction result with a filtering unit, wherein the automatic filtering is based on:
        a reading of an identifier associated with the executing entity and role associated to the executing entity,
        the surveying of the on-site spatial location information of the executing entity,
        accessing the structured datasets and the hierarchical structure, and
        reading an actual time information that is synchronized with the server means; and
    providing the specific on-site task information for handling the physical construction components to the executing entity via the mobile client device, with a dynamic updating of the construction database and the specific on-site task information, and
    handling the physical construction components by the executing entity according to the specific on-site task information,
    wherein the communication link between mobile client device and the server means is at least occasionally offline, and wherein the filtering is done with:
        a pre-work online communication during which one or more of the specific task information are downloaded and locally stored at the mobile client device for offline access,
        an at least occasionally offline working of the executing entity on his specific task information, wherein resulting information of the specific task information is locally buffered by the mobile client device, and
        an uploading of the buffered resulting information upon establishing a post-work online communication to the server means; and
    wherein a tool of the executive entity is automatically controlled and configured in real time based on the specific on-site task information at the tools on-site spatial location.

2. The method according to claim 1, wherein the automatic filtering is done according to the spatial location information of the executing entity and according to spatial location information of the physical construction components by an automatic bidirectional real-time online communication between the mobile client device and the server means via the communication link.

3. The method according to claim 1,
    wherein the downloaded and locally stored specific task information is downloaded in a higher detail level for a defined spatial area around the spatial location of the place of action and in a thereto compared lower detail level in adjacence of the defined spatial area.

4. The method according to claim 1, wherein the automatic filtering of the specific on-site task information comprises an automatic generating of a list of physical construction components, auxiliary materials and tools needed for the specific on-site task information by the executing entity at its spatial location.

5. The method according to claim 1, wherein the automatic filtering of the specific on-site task information comprises an automatic generating of a list of physical construction components, auxiliary materials and tools needed for the specific on-site task information by the executing entity at its spatial location,
    with an automatic filtering of the list for availability of its list-items at or in vicinity of the spatial location of the place of action and providing the list or a subset thereof to one or more executing entities, preferably according to the specific roles of the executing entities.

6. The method according to claim 1, wherein the specific on-site task information is presented to the executive entity in form of augmented reality.

7. The method according to claim 1, wherein the specific on-site task information is presented to the executive entity in form of augmented reality, with virtual views and/or video clips of the specific on-site task information and/or the desired construction result.

8. The method according to claim 1, wherein the specific on-site task information is presented to the executive entity in form of augmented reality,
    graphically overlaid by a dimension measurement information, a handling sequence, an interactive manual and/or a link to online help-hotline, service-hotline, spare-part-hotline, which is corresponding to the specific on-site task information.

9. The method according to claim 1, wherein the mobile client device comprises a camera means for taking an image of the executing entity and/or an on-site environment of the executing entity and built for providing the resulting image to the server means.

10. The method according to claim 9, wherein the image is automatically assigned to corresponding object entities of the database according to the on-site spatial location information and/or according an image-recognition and/or fitting with respect to CAD-data of the object entity from the database.

11. The method according to claim 1, wherein a human executing entity is equipped with a camera means that is comprised in glasses, a helmet, ear protection or safety glasses, and built to provide image information to the mobile client device, wherein the camera means comprises a two and/or a three dimensional camera means, preferably a stereo imaging means, a RIM-camera, a structured light imaging means, a SLAM imaging means and/or a laser-scanning imaging means.

12. The method according to claim 1, wherein the mobile client device comprises a location tracking system for surveying on-site spatial location information, comprising a GPS, a SLAM-Navigation, an IMU and/or a radio or visual navigation system.

13. The method according to claim 1, wherein:
the physical construction component and/or the executing entity comprises a tag,
with an RFID or optical code, and
the mobile client device is reading the identifier associated with the executing entity and/or the physical construction component from the tag.

14. The method according to claim 13, wherein the tag is a location trackable tag and the mobile client device is spatially locating the tag on-site.

15. The method according to claim 1, wherein the mobile client device is tethering with other on-site devices and tools, by one or more local near field mesh networks established by the mobile client device which is functioning as gateway to the server means, wherein the mobile client device is specifically filtering and locally providing on-site task information to on-site devices and tools that lack a direct communication link to the server means.

16. A work information modelling system for automated construction data interchange, comprising:
one or more server means, storing a general construction database with structured datasets of a plurality of object entities representing physical construction components and a hierarchical structure of the object entities representing a desired construction result to be established by the physical construction components,
one or more mobile client devices for a mobile executing entity with a variable place of action,
each of the server means and the mobile client devices comprising a communication interface to establishes a bidirectional communication link of the mobile client device and the server means,
wherein the mobile client device comprises a surveying unit for location tracking of on-site spatial location information of the executing entity at its place of action, and
the mobile client device comprises an automatic filtering unit, configured to automatically filter and prepare a specific on-site task information with respect to a required handling sequence of one or more of the physical construction components for the executing entity directed to establish the desired construction result, wherein the automatic filtering is based on:
a reading of an identifier associated with the executing entity and a therewith linked role associated to the executing entity,
a surveying of the on-site spatial location information of the executing entity and/or of the physical construction components,
accessing the structured datasets and the hierarchical structures of the database, and
reading an actual time information that is synchronized with the server means;

and wherein the mobile client device is configured:
to provide the specific on-site task information for controlling the physical construction components to the executing entity via the mobile client device, and
to establish a dynamic updating of the construction database and the specific on-site task, and
to control the handling of the physical construction components by the executing entity according to the specific on-site task information,
wherein the communication link between mobile client device and the server means is at least occasionally offline, and wherein the filtering is done with:
a pre-work online communication during which one or more of the specific task information are downloaded and locally stored at the mobile client device for offline access,
an at least occasionally offline working of the executing entity on his specific task information, wherein resulting information of the specific task information is locally buffered by the mobile client device, and
an uploading of the buffered resulting information upon establishing a post-work online communication to the server means; and
wherein a tool of the executive entity is automatically controlled and configured in real time based on the specific on-site task information at the tools on-site spatial location.

17. The system according to claim 16, wherein the mobile client device is built to establish an local mesh network with on-site tools by a local communication interface of limited range, and
the filtering unit is built to filter information exchanged in-between the on-site tools and the datasets of the database according to the on-site location information.

18. A mobile client device for a system according to claim 16, wherein the mobile client device comprises a camera unit built to take images and/or videos of the on-site location, wherein the camera unit is comprised in a personal protective equipment for a human executing entity, preferably in a helmet.

19. A non-transitory computer program product with program code being stored on a non-transitory machine readable medium, the program code being configured to execute and operate an automatic filtering of specific task information from a construction database based on spatial location information and a role of an executing entity in a method comprising:
surveying on-site spatial location information of the executing entity at its place of action by location tracking of the executing entity with a location tracking system at a mobile client device,
computing an automatic filtering and preparing of a specific on-site task information with respect to a required handling sequence of one or more physical construction components by the executing entity to establish the desired construction result with a filtering unit, wherein the automatic filtering is based on:
a reading of an identifier associated with the executing entity and role associated to the executing entity,
the surveying of the on-site spatial location information of the executing entity,
accessing a structured datasets and a hierarchical structure, the structured datasets being of a plurality of object entities of the one or more physical construction components, wherein the structured datasets comprise CAD information and attribute information of the object entities, with the hierarchical structure being of the object entities representing a desired construction result to be established by the physical construction components, and reading an actual time information that is synchronized with a server means; and providing the specific on-site task information for handling the physical construction components to the executing entity via the mobile client device, with a dynamic updating of the construction database and the specific on-site task information, and handling the physical construction components by the executing entity according to the specific on-site task information, wherein the communication link between mobile client device and the server means is at least occasionally offline, and wherein the filtering is done with:

a pre-work online communication during which one or more of the specific task information are downloaded and locally stored at the mobile client device for offline access, an at least occasionally offline working of the executing entity on his specific task information, wherein resulting information of the specific task information is locally buffered by the mobile client device, and an uploading of the buffered resulting information upon establishing a post-work online communication to the server means; and wherein a tool of the executive entity is automatically controlled and configured in real time based on the specific on-site task information at the tools on-site spatial location.

* * * * *